July 25, 1944.  L. F. SAYLES  2,354,404
HOLDING BRACKET
Filed Feb. 23, 1943
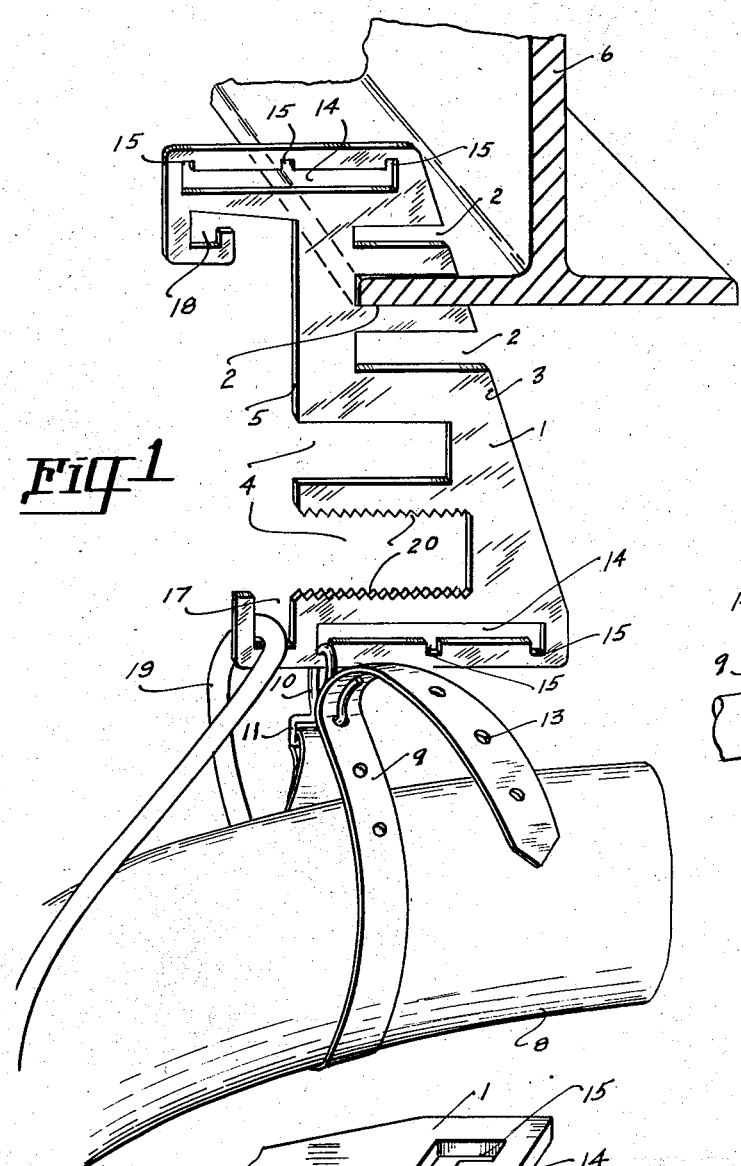
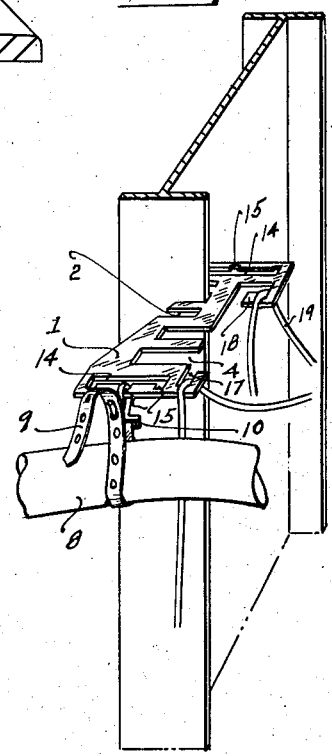
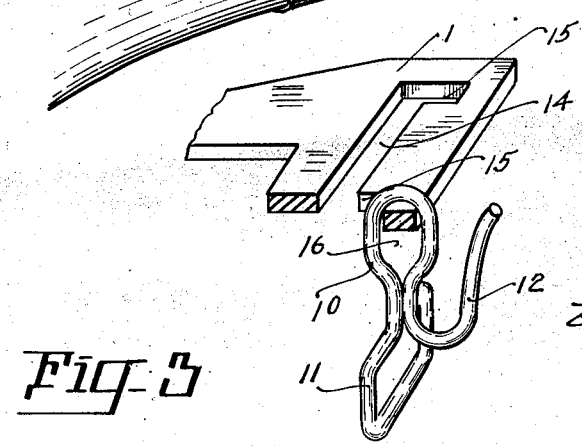
INVENTOR
LOUIS F. SAYLES
ATTORNEY Patented July 25, 1944

2,354,404

UNITED STATES PATENT OFFICE 2,354,404

HOLDING BRACKET

Louis F. Sayles, Portland, Oreg., assignor of one-half to Louise P. Sayles, Portland, Oreg.

Application February 23, 1943, Serial No. 476,840

5 Claims. (Cl. 211—113)

This invention relates to holding brackets and is particularly adapted for supporting ventilating lines, air lines, electric wires and other equipment being used in construction of ships and the like.

The primary object of the invention is to construct a holding bracket having a variety of slots formed therein adapted to fit the various shapes of structures used in the construction of ships and the like.

A further object of the invention is to construct a bracket of one individual piece, having notches cut therein of different dimensions for slipping over beams, plates and other shapes and forms of supports.

Another object of the invention is to provide hooks, notches and slots within the body of the holding bracket for receiving various kinds of holding strips used for attaching ventilating lines, hose lines and wires to the same.

These and other incidental objects will be apparent in the drawing, specification and claims.

Referring to the drawing:

Figure 1 is a perspective view of my new and improved holding bracket attached to a beam and supporting a ventilating line, together with an electric wire or air line.

Figure 2 illustrates my new and improved holding bracket secured to a vertical beam extending outwardly from the beam in a horizontal direction.

Figure 3 is a fragmentary perspective view of the holding bracket, illustrating the method of attaching a holding clip thereto.

In the drawing:

My new and improved holding bracket is illustrated as a unit by numeral 1, having notches 2 formed on one of its sides 3 and notches 4 formed on its opposite side 5. All of these notches are formed into various widths and depths so that they can be attached to supporting members of various thicknesses.

Referring to Figure 1, the bracket 1 is being supported by the horizontal beam 6, by having one of the notches 2 engaging the flange 7 of the beam with sufficient clearance to easily slip over the beam and to provide a binding grip thereon when the load is being supported by the bracket. The load is illustrated as consisting of ventilating tube 8, having a strap 9 encircling the same. One end of the strap is secured to the special fitting 10 at 11, while the holes 13 in the opposite end of the strap engages the hook 12 of the fitting as illustrated.

In Figure 1, it will be noted that the fitting 10 is so located within the slot 14 as to place the weight on the bracket in such a manner as to cause a binding and gripping action between the notch 2 of the bracket 1 and the flange 7 of the supporting beam 6.

The notches 15 are formed in the slot 14 to position and hold the fitting 10 in a location for causing a gripping action between the bracket and the supporting means when the fitting is supporting the load. It will be noted that the loop 16 of the fitting 10 is shaped to work within the notch in such a manner as to prevent movement when the holding bracket is being supported in a horizontal position, best illustrated in Figure 2, and by rotating the fitting the loop 16 permits movement along the slot 14 to another position. This feature is important to the successful operation of the holding bracket, maintaining it in engagement with the supporting framework holding the bracket. Hooks 17 and 18 are formed within the bracket for providing a means of supporting electric wires or hose lines 19 and so forth.

There are many different combinations to be had with my new and improved holding bracket. I have illustrated a horizontal supporting beam and a vertical disposed supporting beam, but there are unlimited and varied forms of applications of my new and improved holding clamp to supporting elements and the bracket will grip and hold to the supporting means at different angles by the proper location of the load to the bracket.

By the use of my new and improved holding bracket, a standard size bracket can be used, making it a simple matter to adapt the bracket to most conditions encountered on structural construction work, especially as in ship building.

When my clamp is to be applied to a specified condition, one of the notches 2 or 4 are selected for engaging the supporting beam or plate, the fitting 10 is then applied to the proper location within the slot 14 for causing the bracket to grip the supporting structure by putting a twisting or cinching movement to the notch engaging the support, causing the notch to pinch and grip the support. The notches 2 and 4 may have corrugated surfaces 20 for adding to their gripping action relative to the support.

I do not wish to be limited to the exact structure illustrated, as other forms of embodiment may be used still coming within the scope of my claims.

What is claimed is:

1. A one-piece supporting bracket, including a plate having its opposing side edges formed with fixture-engaging channels, each channel opening through the edge from which it extends and terminating short of the opposite edge, the end portions of the plate beyond the channeled area being formed with elongated closed slots to receive article-support connectors.

2. A construction as defined in claim 1, wherein the slots are substantially parallel to the channels, and wherein one longitudinal wall of at least one slot is formed with notches to determine a desired weight-influencing position of an article-support connector to insure a clamping action by the walls of a particular channel on a selected support.

3. A one piece supporting bracket, including a plate having its opposing side edges formed with fixture-engaging channels, each channel opening through the edge of the plate from which it extends and terminating short of the opposite edge of the plate, one edge of the plate at least throughout its channeled area being inclined longitudinally of the plate to vary the lengths of the respective channels opening through such inclined edge.

4. A one-piece supporting bracket, including a plate having its opposing side edges formed with feature-engaging channels, each channel opening through the edge from which it extends and terminating short of the opposite edge, the end portions of the plate beyond the channeled area being formed with elongated closed slots, an article support to cooperate with either slot, a wall of each of the slots being formed to receive and predetermine the position of the article support, whereby to cause the article connected to said support to exert a sufficient weight on the plate to frictionally bind the walls of a selected channel in cooperation with a plate support.

5. A holding bracket, comprising a plate formed with a multiple of channels of different widths, the plate being formed at opposite ends with slots with notches formed in one wall of each slot, a fitting co-acting with the slots and engaging the notches therein, and a strap carried by the fitting and foldable to form a holding loop, the plate being formed with a supporting hook adjacent each slot.

LOUIS F. SAYLES.